US012708809B2

(12) United States Patent
Spencer et al.

(10) Patent No.: US 12,708,809 B2
(45) Date of Patent: Aug. 18, 2026

(54) FIRE BLANKET

(71) Applicants: University of Maryland, College Park, College Park, MD (US); Charles Spencer, Brisbane, CA (US)

(72) Inventors: Charles Spencer, Brisbane, CA (US); Amr Baz, Rockville, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

(21) Appl. No.: 19/031,331

(22) Filed: Jan. 17, 2025

(65) Prior Publication Data

US 2025/0319338 A1 Oct. 16, 2025

Related U.S. Application Data

(60) Provisional application No. 63/621,989, filed on Jan. 17, 2024.

(51) Int. Cl.
*A62C 8/06* (2006.01)

(52) U.S. Cl.
CPC .................................... *A62C 8/06* (2013.01)

(58) Field of Classification Search
CPC ...... A47G 9/02; A47G 9/0207; A47G 9/0215; A47G 9/0223; A62C 8/06
See application file for complete search history.

(56) References Cited

U.S. PATENT DOCUMENTS 2,683,876 A * 7/1954 Sullivan .................... G21F 3/02 2/84
4,602,385 A * 7/1986 Warren .............. A41D 13/0518 2/92
5,104,700 A * 4/1992 Peterson ................ F16L 57/04 428/218
5,875,598 A * 3/1999 Batten ..................... E04B 1/681 52/573.1
8,156,703 B2 * 4/2012 Alderman ................ B32B 3/08 52/407.3
2002/0095727 A1 * 7/2002 Saparow .............. A47G 9/0284 5/482

(Continued)

*Primary Examiner* — George Sun
(74) *Attorney, Agent, or Firm* — GIBRALTAR CONSULTING LLC; Tariq Najee-Ullah

(57) ABSTRACT

Disclosed herein is a fire blanket that may include a thermal housing. A fire blanket may include one or more shape memory elements having a first orientation at a first temperature, the one or more shape memory elements are retained within a compartment of the thermal housing, the one or more shape memory elements are configured to expand to a second orientation when exposed to a second temperature being greater in value than the first temperature. The fire escape blanket includes a thermal housing with fire-resistant exterior and interior layers. Shape memory elements are retained between the layers and expand when exposed to elevated temperatures, creating insulating air pockets. A gusset connects the layers and allows expansion as the shape memory elements transform. The blanket includes a hood portion, handles, and hand covers for user protection and maneuverability. Passively activated expansion provides tunable insulation, improving survival chances when escaping fires.

16 Claims, 12 Drawing Sheets

(56) References Cited

U.S. PATENT DOCUMENTS

| | | | | |
|---|---|---|---|---|
| 2006/0010798 | A1* | 1/2006 | Shaw | E04B 1/948<br>52/232 |
| 2008/0189840 | A1* | 8/2008 | Knoff | B32B 5/26<br>2/458 |
| 2009/0242217 | A1* | 10/2009 | van de Loenhorst | A62C 8/06<br>169/48 |
| 2010/0263104 | A1* | 10/2010 | Flannery | A47G 9/066<br>219/211 |
| 2013/0157039 | A1* | 6/2013 | Browne | B32B 27/20<br>428/313.9 |
| 2013/0174334 | A1* | 7/2013 | Kuroda | D03D 1/0041<br>2/455 |
| 2013/0239308 | A1* | 9/2013 | Baz | A62B 17/003<br>2/458 |
| 2017/0347813 | A1* | 12/2017 | Chapin | A47G 9/0261 |
| 2023/0270268 | A1* | 8/2023 | Pham | A47G 9/0223<br>5/486 |

* cited by examiner

1000

1100

FIRE BLANKET

This invention was made with government support under IIP2042676 awarded by the National Science Foundation. The government has certain rights in the invention.

FIELD OF INVENTION

Embodiments disclosed herein relate to heat and fire protective items, and more particularly to a fire blanket having an expandable textile with shape memory alloy heat activated elements.

BACKGROUND OF THE INVENTION

M any households do not prepare for fire events and many households are unaware of the emergency procedures needed to minimize chances of death or injury during a fire event. It is currently known for a wet towel or a damp blanket to be used as a barrier when an individual needs to run through excessive heat and fire in an emergency. It would be more desirable to prompt communities and individuals to prepare for fire events by providing a solution to fire event preparation. As a result, it is envisioned that this invention will help to improve chances of survival by reducing heat and fire related injuries and fatalities. In today's market, fire blankets are generally made of a single layer of thin material such as, asbestos, wool, cotton, fiberglass, carbon felt, aluminum or silica. Many of these fire blankets do not maintain their integrity due to the thin material layer and when exposed to excessive heat or flames, one-layer blankets may lay directly on and/or next to a user's skin and/or clothing. As a result, this contact may injure property and/or skin. Further, some of the materials used to make the fire blanket are toxic and may impact a user's ability to breathe. Blankets that are designed to protect people and/or property from excessive heat and fire may be constructed of glues that deteriorate when heated; and hazardous materials such as asbestos or materials that easily ignite or become airborne when exposed to a flame. M any of these fire blankets are most frequently designed for use to extinguish an object such as, a localized stove or a small cigarette fire by laying the fire blanket on top of the fire and are not designed to be used to protect a person during a fire event. There is a long felt, yet unfulfilled, need for a fire blanket to be consistently part of a fire event preparation kit configured for use on an individual.

Further, the market has remained consistent with innovation being developed in the form of short shelf-life fire extinguishers, chemical laced fire-resistant foams, and ineffective coverings for protecting objects from heat and fire and in the costly increase of private sector firefighting resources hired during fire season. There is a need to reduce many of these existing fire prevention resources to enhance safety, reliability, and effectiveness of heat and fire protective items configured for protecting an individual from heat and fire.

Accordingly, there remains a need for improved heat and fire protective items. This need and other needs are satisfied by the various aspects of the present disclosure.

SUMMARY OF THE INVENTION

In accordance with the principles of the present invention, a fire blanket may include a thermal housing. A fire blanket may include one or more shape memory elements having a first orientation at a first temperature, the one or more shape memory elements are retained within a compartment of the thermal housing, the one or more shape memory elements are configured to expand to a second orientation when exposed to a second temperature being greater in value than the first temperature, and which also includes improvements that overcome the limitations of prior art fire blankets is now met by a new, useful, and non-obvious invention.

In accordance with the purposes of the invention, as embodied and broadly described herein, the invention, in one aspect, relates to a fire blanket utilizing air gaps to create space with and/or without shape memory elements. Beyond this need, there is a need to motivate more people to prepare for fire events. People in the snow belt prepare for winter by weatherizing automobiles, purchasing snow salt and shovels. Floridians prepare for hurricanes by stocking up on water and purchasing shutters. People across the United States should prepare for fire events.

The market and addressable market include both wildfire and home fire events that affect all areas of the United States and many countries around the world. The increasing frequency and size of wildfires combined with the intensity of home fires contribute to fire event fatalities and/or injuries. The continued expansion of the wildland urban interface across the United States will expose more communities to wildfire, while the increasing use of plastics, synthetic fibers and compressed wood in home furnishings dramatically increases home fire risk. In one or more aspects, the present invention may provide for a fire blanket utilizing shape memory elements. At low ambient temperatures, the fire blanket assumes the configuration in which the shape memory elements are embedded inside the thermal insulation layer in such a way that results in no air pockets. Once the user is exposed to excessive heat, the shape memory elements undergo a unique phase transformation and begin expanding to generate an air pocket. In this manner, the blanket thermal insulation characteristics are enhanced reducing the heat flow from the fire to the user. This will make the user less susceptible to burn injuries. With further exposure to excessively high temperatures, the shape memory elements continue to expand, generating larger air pockets. Such tunable capabilities according to the condition of the fire may be achieved passively and without any effort from the user. This transformation is accomplished by the proper training of the shape memory elements to complete its phase transformation at excessively higher temperatures.

In an aspect, arrangements of the shape memory elements inside the blanket are tentatively envisioned to be oriented where each element will be organized between two layers of fire-resistant fabric that enable folding the blanket for storage before deployment. The use of 3D printing technology may affect the construction and placement of SMEs within the blanket.

In an aspect, the fire blanket includes two pockets. It is important to note that when the shape memory element is at room temperature, the shape memory elements are soft and pliable as they exist in the "Martensite" phase which enables the easy folding of the fire blanket. When the blanket is ready for use it is expanded manually by expanding the accordion configuration. The expansion process may also be easily done without any appreciable effort by the user. Once the fire blanket is exposed to excessive heat, the shape memory elements are activated, and its phase is transformed to "Austenite" which is stiffer than the "Martensite" phase. Such a stiffening effect causes the shape memory elements to expand while maintaining its structural integrity. This feature becomes extremely important particularly when constructing a fire shield.

In an aspect, the fire blanket has unique self-tuning characteristics that enable the blanket to adjust the thickness of the air pockets according to the temperature of the fire scene. Accordingly, better burn mitigation capabilities can be achieved.

In an aspect, the fire blanket provides two layers of protection from the fire. The level of fire and heat increases the level of protection due to the expansion of the shape memory wire.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and together with the description, serve to explain the principles of the invention.

Figure 1:
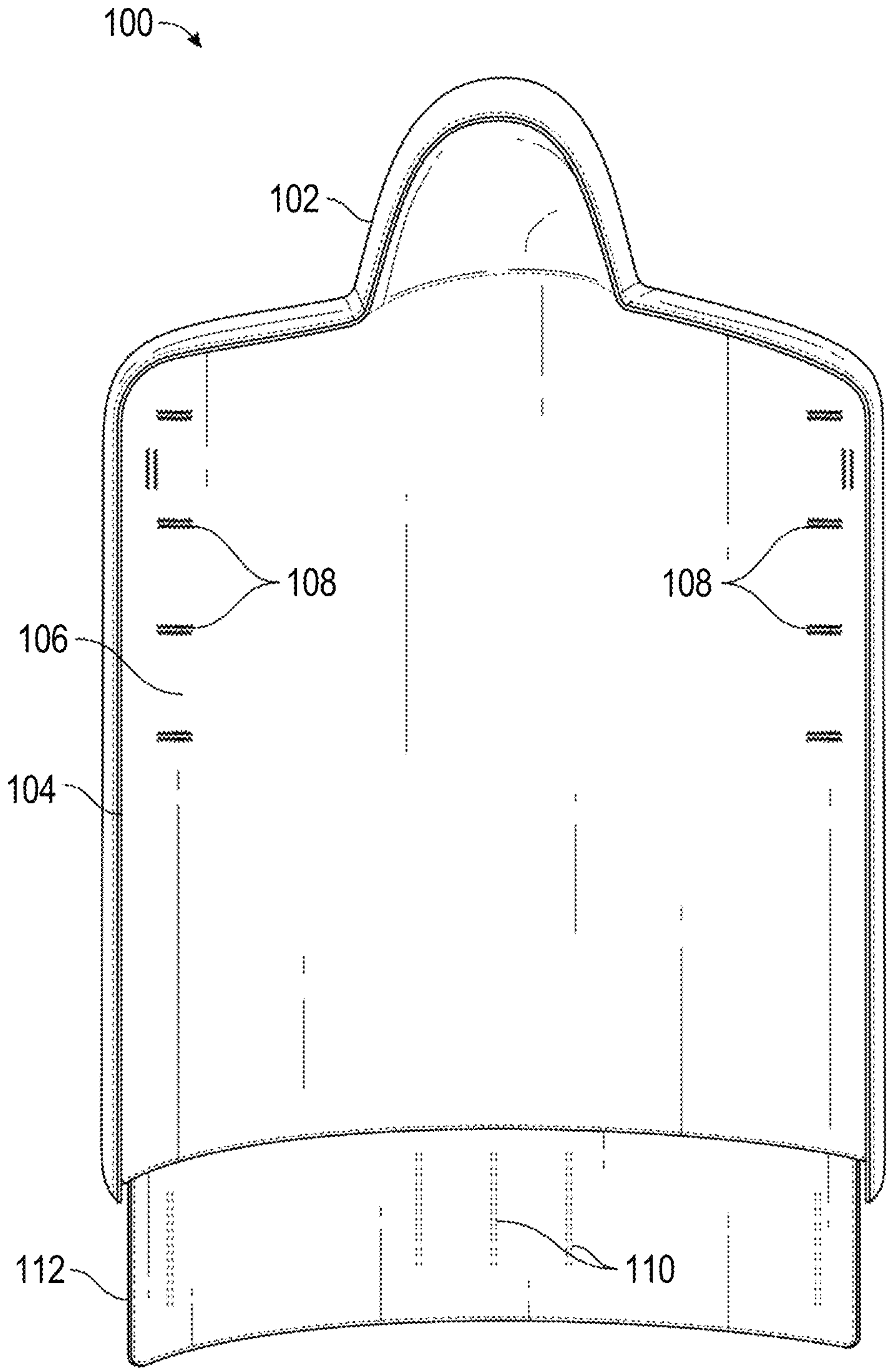
FIG. 1 shows a user interior perspective view of the fire blanket, in accordance with an exemplary embodiment of the present invention.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to “claimed subject matter” refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION OF THE INVENTION

The present invention can be understood more readily by reference to the following detailed description of the invention and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term “comprising” can include the aspects “consisting of” and “consisting essentially of.” Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms “a,” “an” and “the” include plural referents unless the context clearly dictates otherwise. Thus, for example, reference to “an opening” can include two or more openings.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated by some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to manufacture the disclosed devices, systems, and articles of the invention as well as the devices themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the invention. Thus, if there are a variety of additional steps that can be performed it is understood that each of these additional steps can be performed with any specific aspect or combination of aspects of the methods of the invention.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

FIGS. 1-9 show fire blanket having an expandable textile with heat activated elements. Thermal housing has first layer of material being a material including, but not limited to, a burn resistant material and/or a fire-resistant material. Thermal housing is formed by first layer of material overlaying second layer of material being a material including, but not limited to, a burn resistant material and/or a fire-resistant material. Shape memory element is retained within the interlining compartment of thermal housing and is restrained by pencil pockets. It is within the scope of this invention for shape memory element to be referred to as an interlining and/or a middle layer.

Referring again to FIG. 1-9, a shape memory element is provided. It is within the scope of this invention for shape memory element to include, but not be limited to, a variety of nickel titanium alloys or other shape memory metals in combination with iron or other metal, unbundled 1 mm round wire or other diameter wire, and/or single joined nitinol wire. Shape memory element has a first orientation at a first temperature. It is within the scope of this invention for first orientation to include, but not be limited to a martensitic crystalline structure. The characteristics of martensite include its ability to reverse a heat induced transformation and the ability to instantaneously transform its shape in all directions. The temperature dependent properties of Nitinol are determined by its crystalline structure. When exposed to temperatures lower than the transformation temperature, nitinol transforms into a monoclinic crystal structure. This structure exhibits the characteristic of nitinol deformation without breaking atomic bonds. At higher temperatures, Nitinol assumes a cubic crystal structure referred to as austenite. Deforming the nitinol deforms the crystalline structure creating internal stress. Heating the nitinol above its transition temperature (austenite phase), relieves stress in the crystalline structure by returning to its original shape.

Shape memory element is configured to expand to a second orientation (not shown) when exposed to a second temperature being greater in value than the first temperature. It is within the scope of this invention for the second orientation to include, but not be limited to, austenite.

Austenitization is defined as the process of heating a shape memory element to a temperature that facilitates a transformation of crystal structure.

Figure 2A:
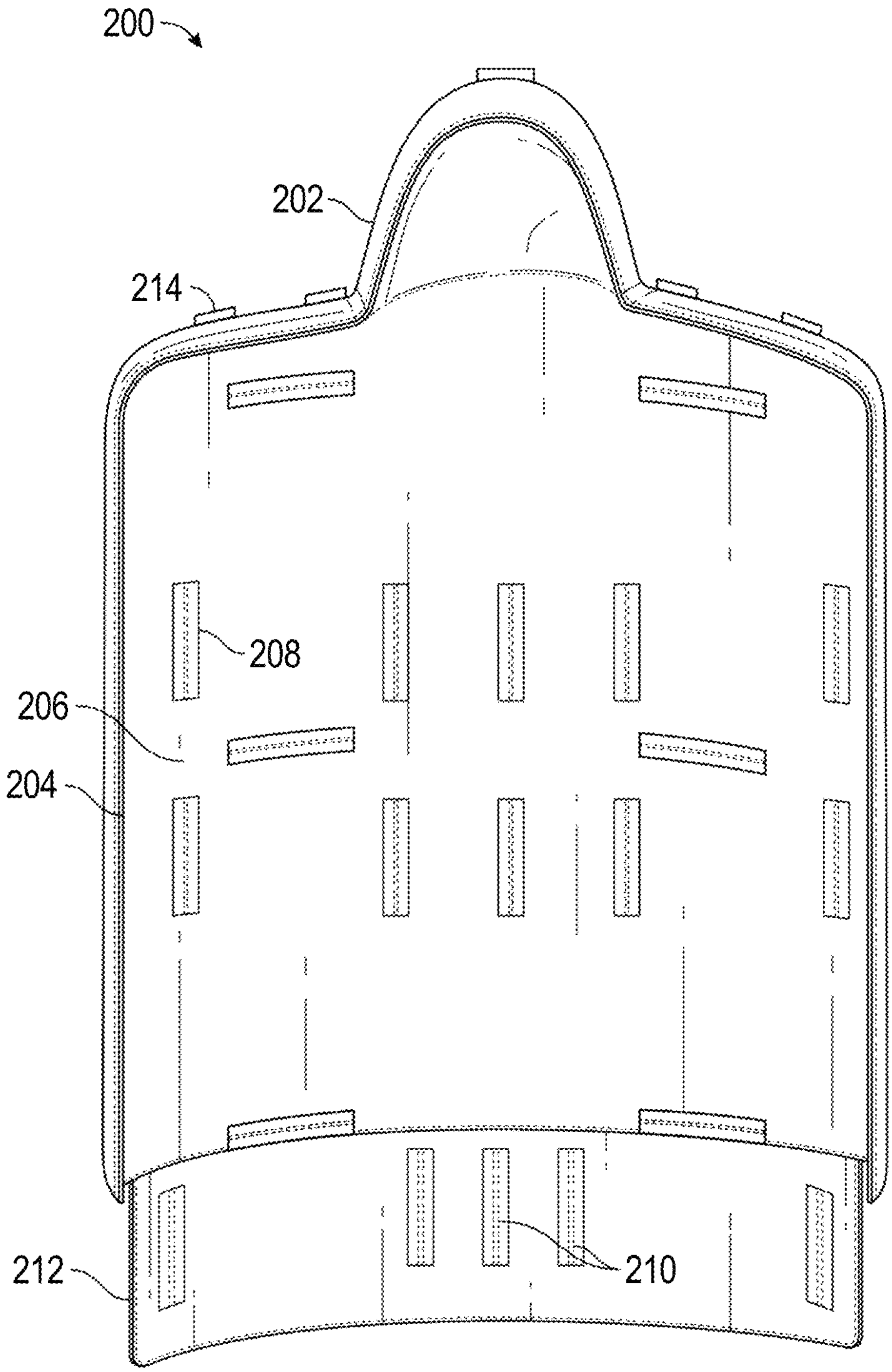
FIGS. 2A and 2B shows a view of the fire blanket having a plurality of pencil pockets that connect the shape memory wire to the outer layer in accordance with an exemplary embodiment of the present invention.
Figure 2B:
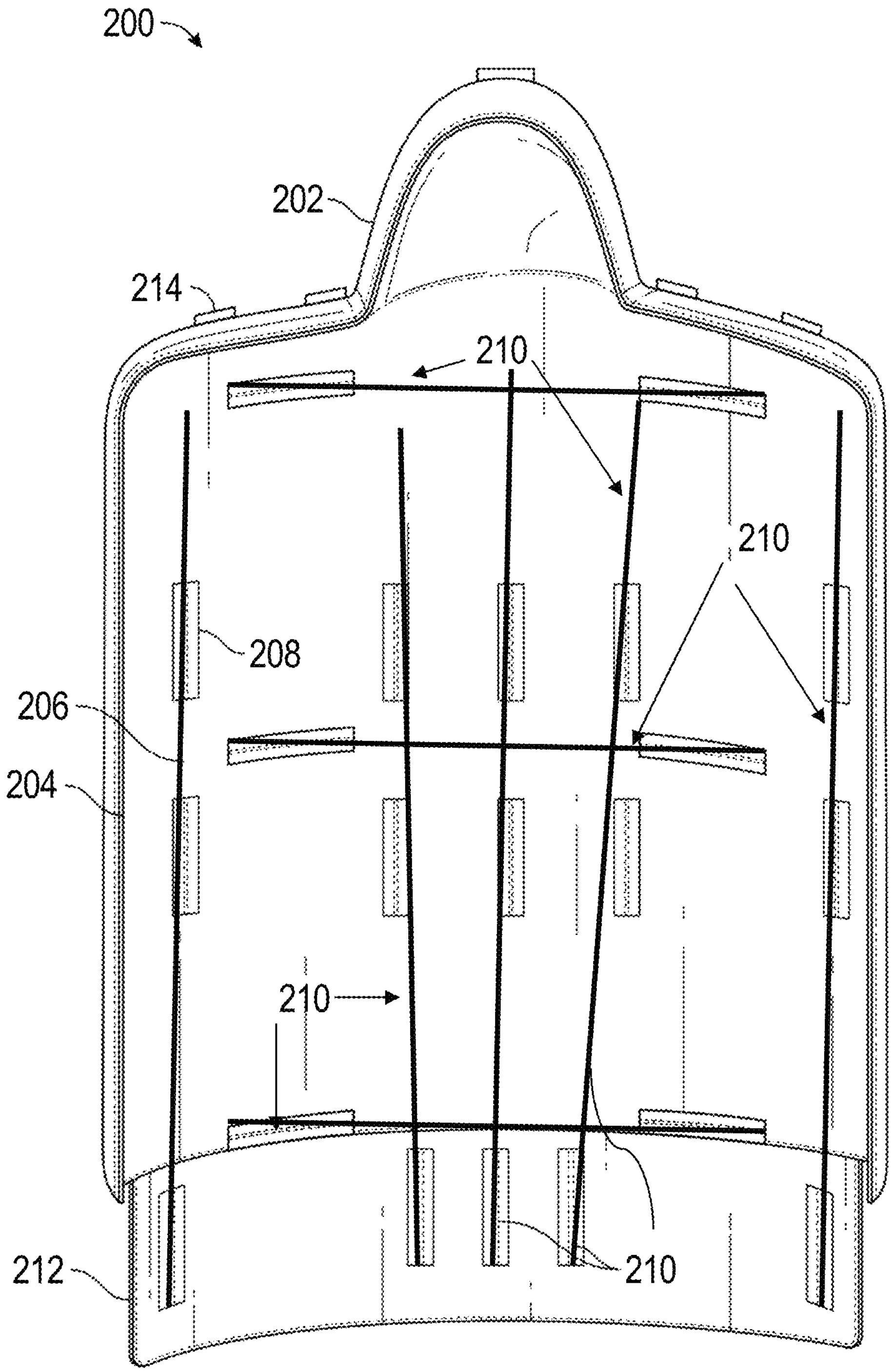
Figure 3:
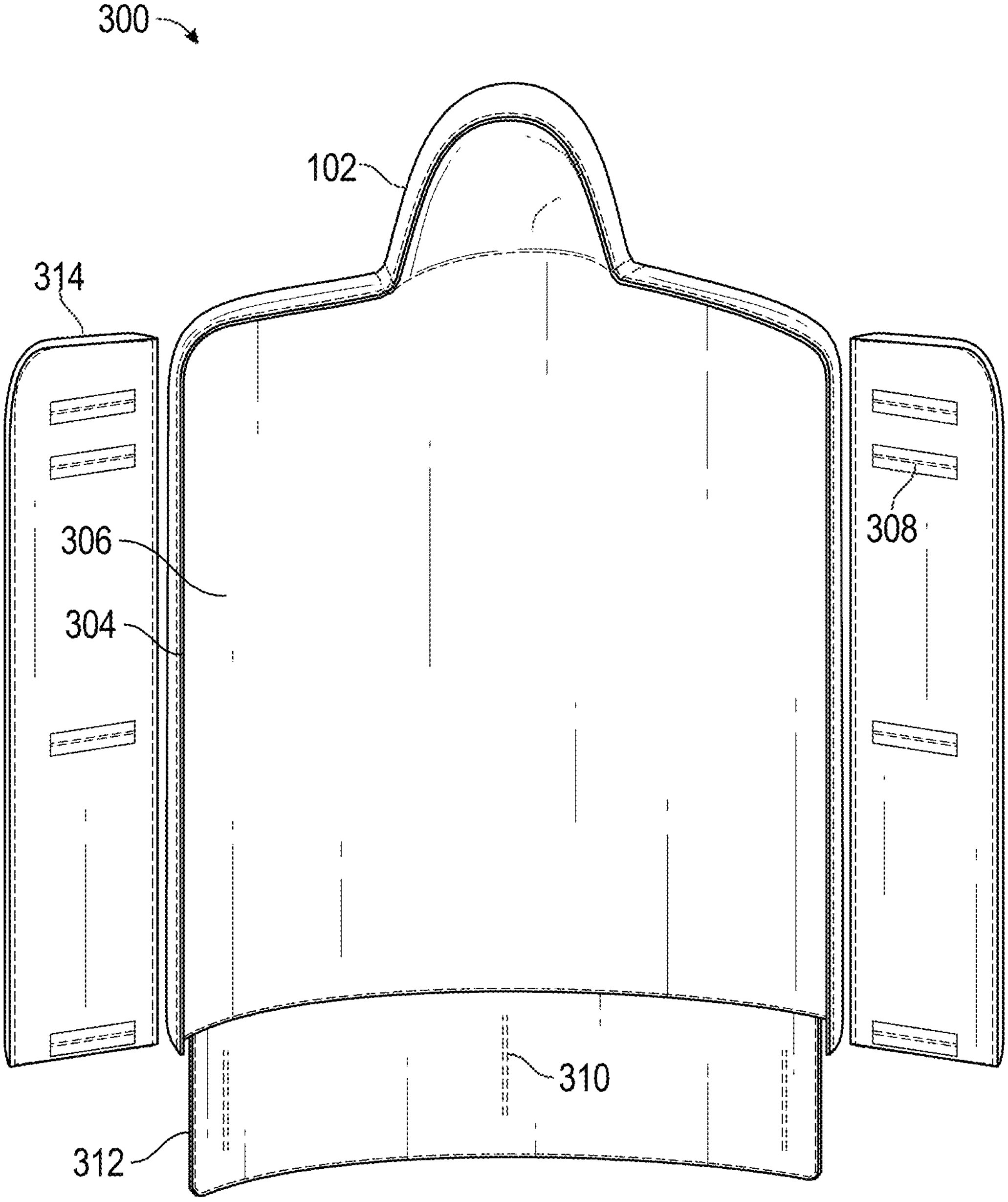
FIG. 3 shows an interlining perspective view of the fire blanket having multiple pencil pockets attached to the gussets connecting the interlining with the gussets.

Referring again to FIGS. 2A, 2B, and 3, the gusset connects first layer of material of thermal housing to second layer of material thermal housing. As shape memory element expands from first orientation to an expanded second orientation, the gusset expands to enlarge compartment of thermal housing. It is within the scope of this invention for a gusset to have at least one accordion type fold and/or a plurality of folds. Referring now to FIGS. 2-3, the gusset may be located on at least one side of thermal housing. In an embodiment, the gussets may wrap around the sides, bottom and the top of thermal housing. Drawstring extend from the hood to assist in securing the hood to the users head. At least a portion of drawstring is retained within first layer of material of thermal housing Fire blanket may have pocket and/or pocket connected to first layer of material of thermal housing.

Figure 4:
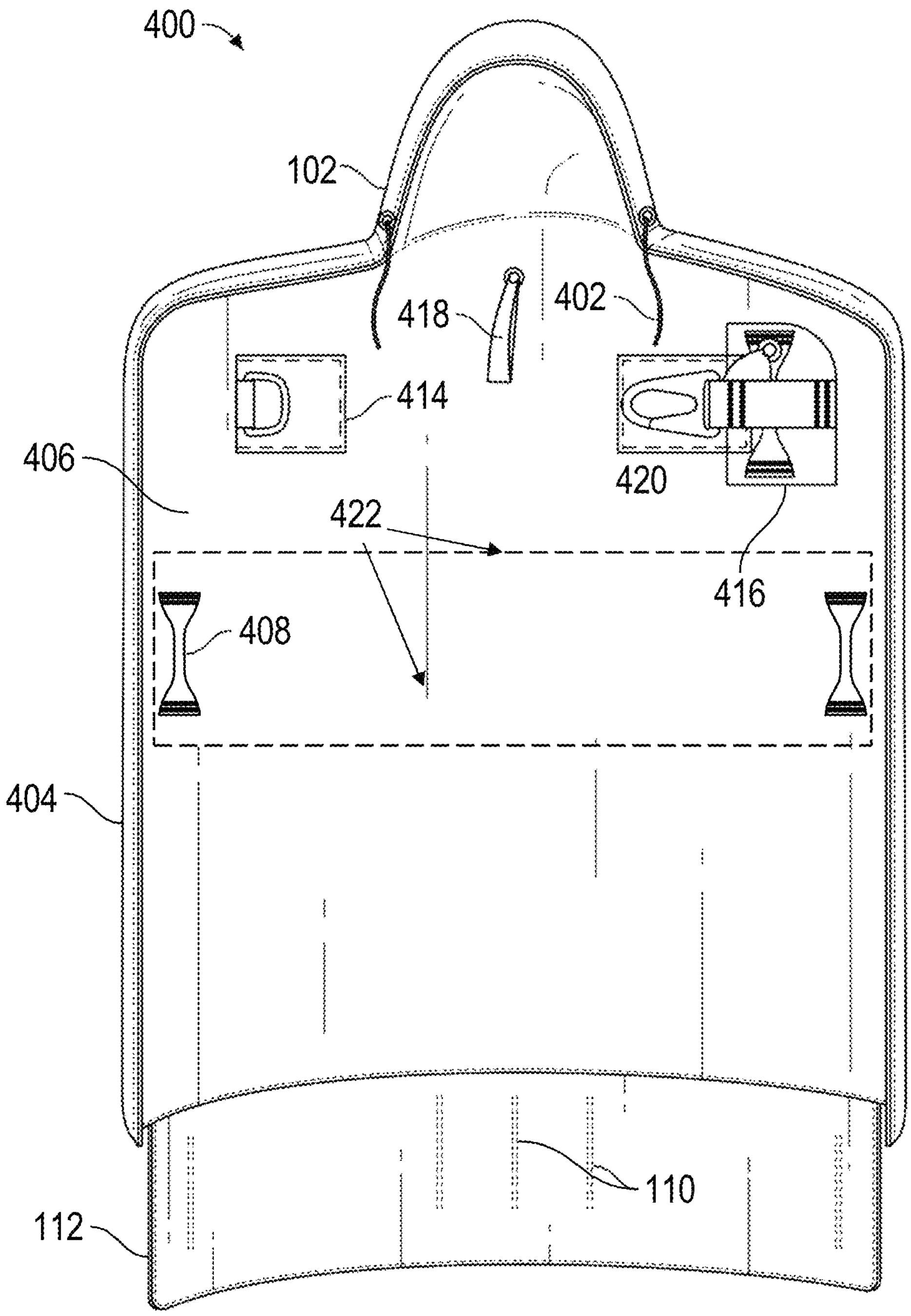
FIG. 4 shows a User view of the blanket including hood, instructions for use, handles, D-ring and clasp, pockets, dragline and emergency seat, in accordance with an exemplary embodiment of the present invention.

FIG. 4 shows fire blanket having first hand cover overlaying first set of handles and handle. First handle used to control and close blanket and the second handle used by two people to carry a third person in an emergency.

FIGS. 2A, 2B, 3 and 4 shows fire blanket 100 having plurality of pencil pockets being configured to connect all layers of material and the gusset. Sewn seams, pencil pockets or a plurality of fasteners may also be configured to connect second layer of material to gusset. In an embodiment not shown, sewn seams or a plurality of fasteners are also configured to connect interlining and/or shape memory element to the thermal housing. It is within the scope of this invention for gusset to be made of a heat and/or fire-resistant material. All handles are configured to connect to the first layer (interior) of material 104 of thermal housing.

FIG. 4 best shows fire blanket having hood portion connected to at least a portion of first layer of material of thermal housing. Hood portion is a portion of material having a compartment configured to receive at least a portion of a user's head. Shape memory element overlays second layer of material of thermal housing. Gusset is located between first layer of material and second layer of material.

Figure 5:
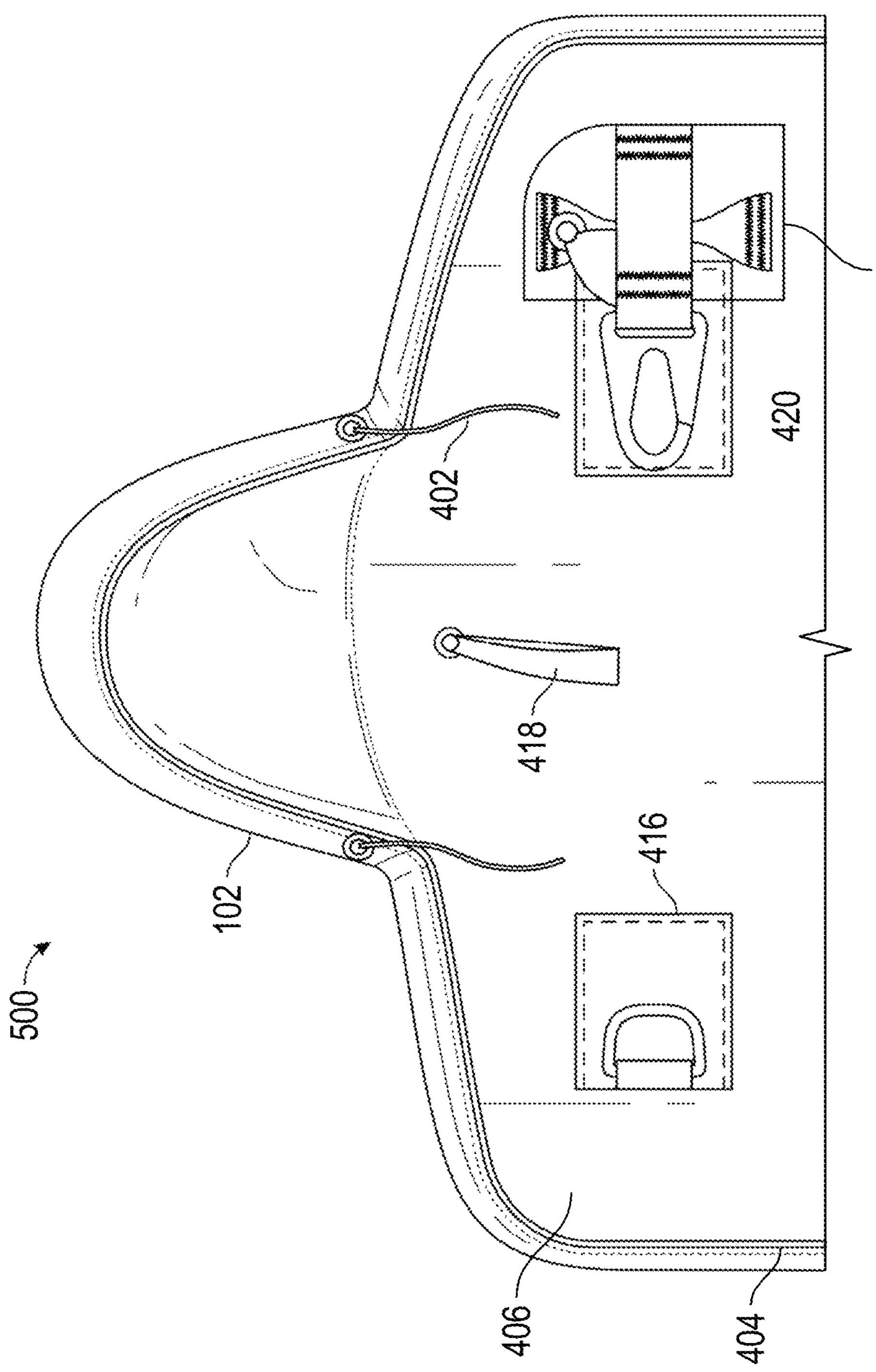
FIG. 5 shows a front cutout view of the fire blanket D-ring and clasp, pockets, and handles used to hold the blanket when in use, in accordance with an exemplary embodiment of the present invention.

FIGS. 4-5 best show fire blanket having drawstring around the hood . . . . As best shown in at least a portion of drawstring is retained within a track or recess (not shown) of first layer of material of thermal housing . . . . The interlining channel is an air gap that allows room for shape memory element to expand into during the expansion process. Further, this channel allows room for folds of gusset to be stacked (not shown).

A Iso shown are the D-ring and clasp used to secure the blanket to a user during movement or when incapacitated. The D-ring and clasp should be secured before pulling a user with the dragline shown in FIG. 4-5.

Figure 10:
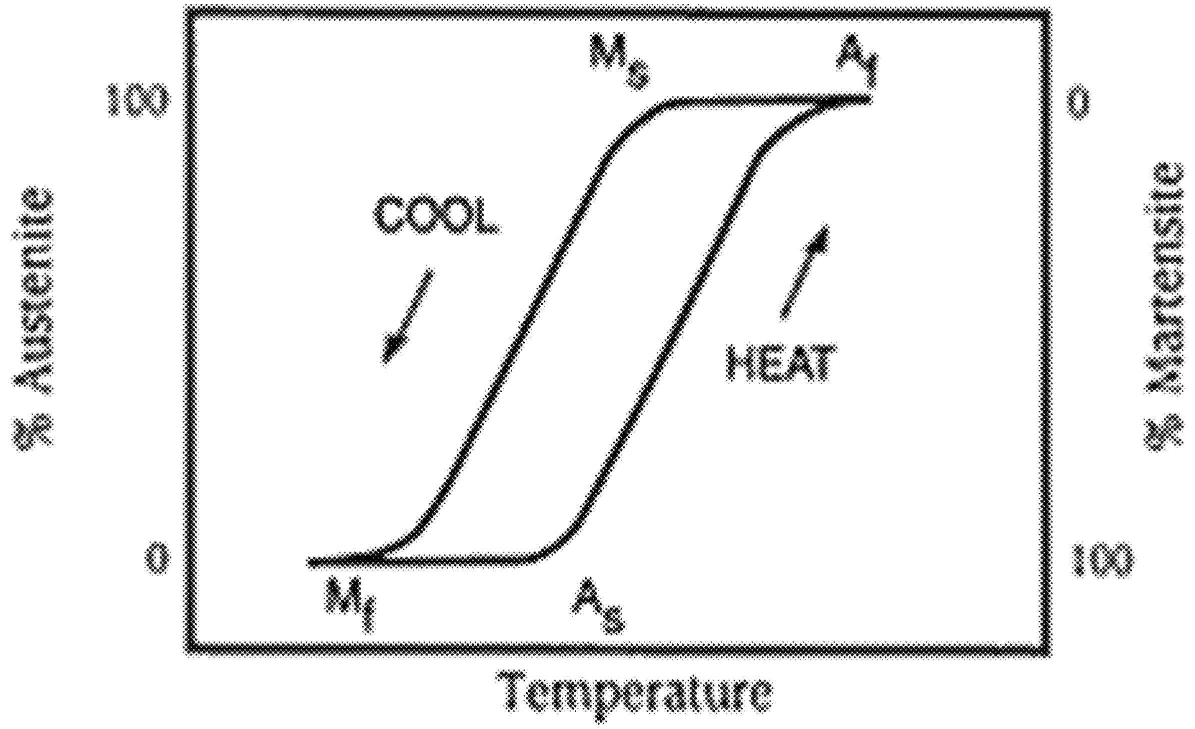
FIG. 10 shows a graph illustrating martensite/austenite fractions during the phase transformation of nickel-titanium fibers, in accordance with an exemplary embodiment of the present invention.

FIG. 10 shows graph 1000 illustrating martensite/austenite fractions during the phase transformation of nickel-titanium fibers. The present disclosure, according to further aspects, also provides for the fire blanket, consisting of a heat and flame-resistant exterior and interior textile and shape memory wire interlining constitute the basic parts of the fire blanket materials. The fire blanket also consists of shape memory transformation features. The shape memory effect refers to the ability of the fibers to return to a predetermined (trained) shape when heated. The shape memory effect is caused by a temperature dependent crystal structure. When a fiber operates below its phase transformation temperature, it possesses a low yield strength crystallography referred to as martensite. While in this state, the material can be deformed into other shapes with relatively little force. The new shape is retained provided the material is kept below its transformation temperature.

Figure 11:
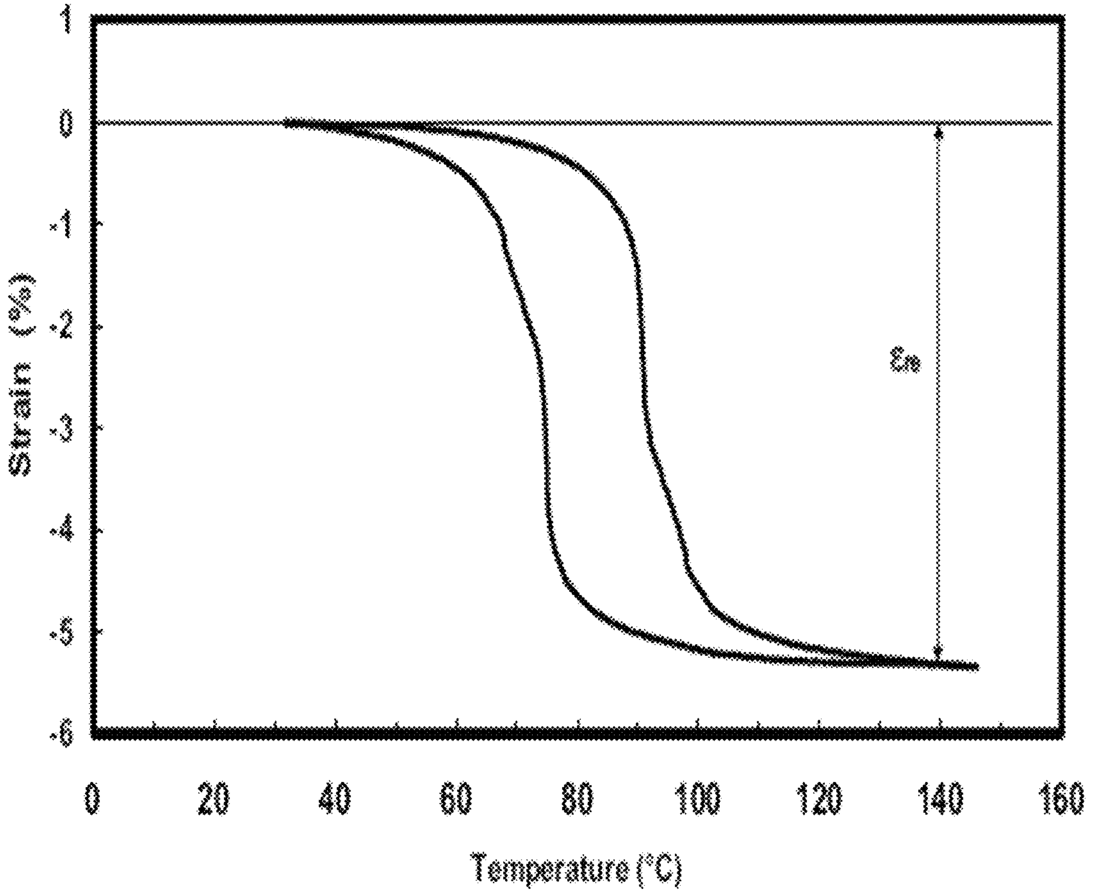
FIG. 11 shows a graph illustrating strain-temperature characteristics during the phase transformation of nickel-titanium fibers, in accordance with an exemplary embodiment of the present invention.

FIG. 11 refers to graph 1100 illustrating strain-temperature characteristics during the phase transformation of nickel-titanium fibers. When heated above this temperature, the material reverts to its parent structure known as austenite causing it to return to its original shape. This unique phase transformation phenomenon, from martensite to austenite during heating and back during cooling, will be utilized to create air pockets inside the fire blanket.

FIG. 1 shows a user interior perspective view of the fire blanket. The fire blanket 100 includes a hood portion 102 at the top. The sides of the blanket have outer gussets 104 and 106. On the interior surface, the backside of handles 108 and pencil pockets 110 are visible. At the bottom is a bottom gusset 112.

FIG. 2A depicts a frontward facing view of the interior surface of the exterior layer of the fire blanket. The interlining layer 200 includes the shape memory wire elements. The hood portion 202 is at the top, with outer gussets 204 on the sides. The interior layer 206 is visible, along with the backside of pencil pockets 208. At the bottom is the bottom gusset 212.

FIG. 2B shows the same view as 2A, but with the shape memory wire elements visible. Five vertical wires extend from the hood to the base, with three horizontal wires spanning across. The key components are labeled the same as in 2A, with the addition of the shape memory wires 210.

FIG. 3 illustrates the fire blanket after the shape memory wire has been activated, giving the fabric a rigid and protective shape. The hood 302, outer gusset 304, interior layer 306, and bottom gusset 312 are visible. Pencil pockets 308 are shown on the gusset, and a side gusset 314 is also depicted.

FIG. 4 shows the backside of the interior layer, or outer surface of the interior layer of the fire blanket. The hood 102 includes a drawstring 402. The outer gusset 404 and outer surface of the interior layer 406 are visible. Emergency seat handles 408, pockets 414, regular handles 416, a drag line 418, D-ring and clamp 420, and emergency seat 422 are all labeled.

FIG. 5 provides a cutout view of FIG. 4, focusing on the hood 102, drawstring 402, handle 416, drag line 418, and D-ring and clamp 420.

Figure 6:
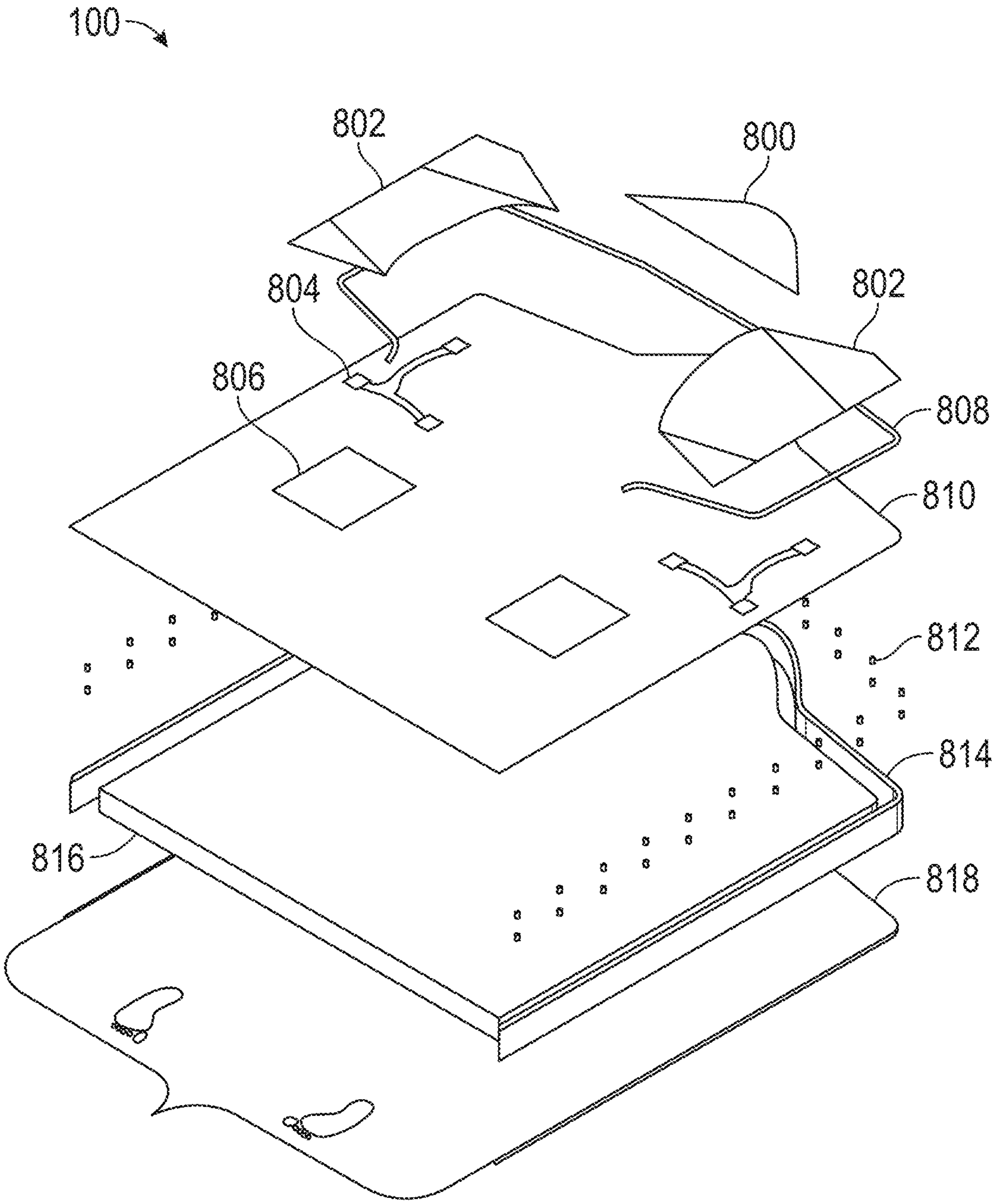
FIG. 6 shows an exploded view of the fire blanket having a plurality of fasteners to connect the first and second layers of material of the thermal housing to the gusset in accordance with an exemplary embodiment of the present invention.

FIG. 6 presents an exploded view of an alternative embodiment of the fire blanket. It shows the three main layers—the outward facing layer, interlining layer with shape memory wire and pencil pockets, and the interior layer. Key components include the hood 800, hand covers 802, handles 804, pockets 806, drawstring in channel 808, interior panel 810, snap rivets 812, gusset 814, shape memory wire 816, and exterior panel 818. A drag line 820 at the base of the hood, emergency seat 822, and D-ring and clip 824 for securing to the user are mentioned but not shown in the figure.

Moreover, FIG. 1 shows a user interior perspective view of the fire blanket comprising: Fire blanket (100); Hood (102); Outer gusset (104); Interior layer (106); Backside of fire blanket handles (108); Backside of pencil pockets (110); Bottom gusset (112).

FIG. 2A shows a frontward facing view of the interior surface for the exterior layer of the fire blanket. It includes: Interlining layer with shape memory wire (200); Hood (202); Outer gusset (204); Interior layer (206); Backside of pencil pockets (208); Bottom gusset (212).

FIG. 2B shows the same view as 2A but with the shape memory wire elements visible. It includes: Five vertical shape memory wires running from hood to base and three horizontal wires extending from edges further comprising: Shape memory wire (210).

FIG. 3 shows the interior surface of the exterior layer after the shape memory wire has been activated, giving the fabric a rigid protective shape. It includes:

Hood (302)
Outer gusset (304)
Interior layer (306)
Pencil pockets on gusset (308)
Side gusset (314)

FIG. 4 shows the backside of the interior layer (outer surface of interior layer). It includes:

Hood (102)
Drawstring (402)
Outer gusset (404)
Outer surface of interior layer (406)
Emergency seat handles (408)
Pocket (414)
Handle (416)
Drag line (418)
D-ring and clamp (420)
Emergency seat (422)

FIG. 5 shows a cutout view of FIG. 4, focusing on:

Hood (102)
Drawstring (402)
Handle (416)
Drag line (418)
D-ring and clamp (420)

Figure 7:
FIG. 7 shows a front plan view of the fire blanket as deployed, in accordance with an exemplary embodiment of the present invention.
Figure 8:
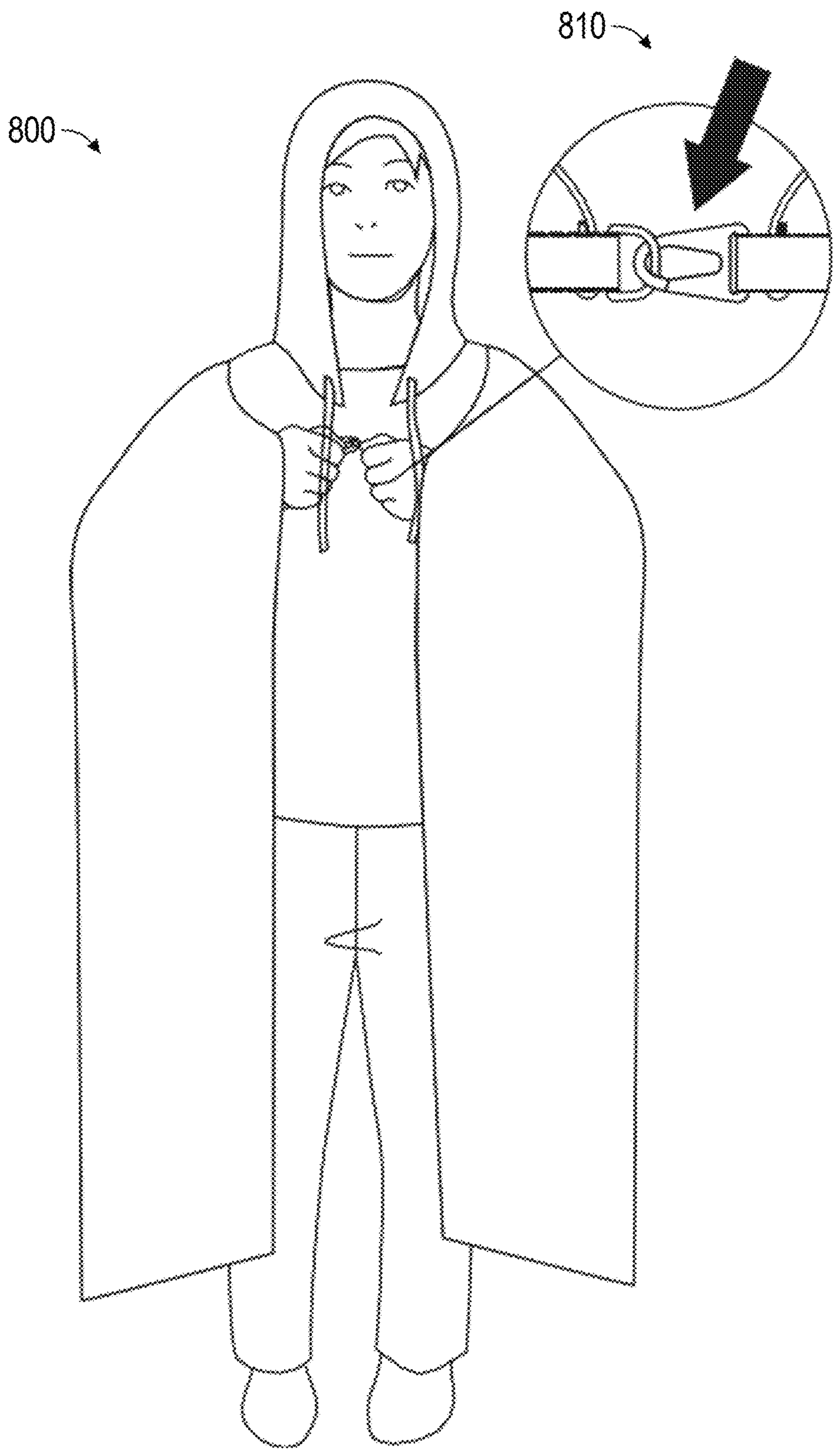
FIG. 8 shows a front view of the fire blanket, with a cutout of the user D-ring and clasp assembly in accordance with an exemplary embodiment of the present invention.
Figure 9:
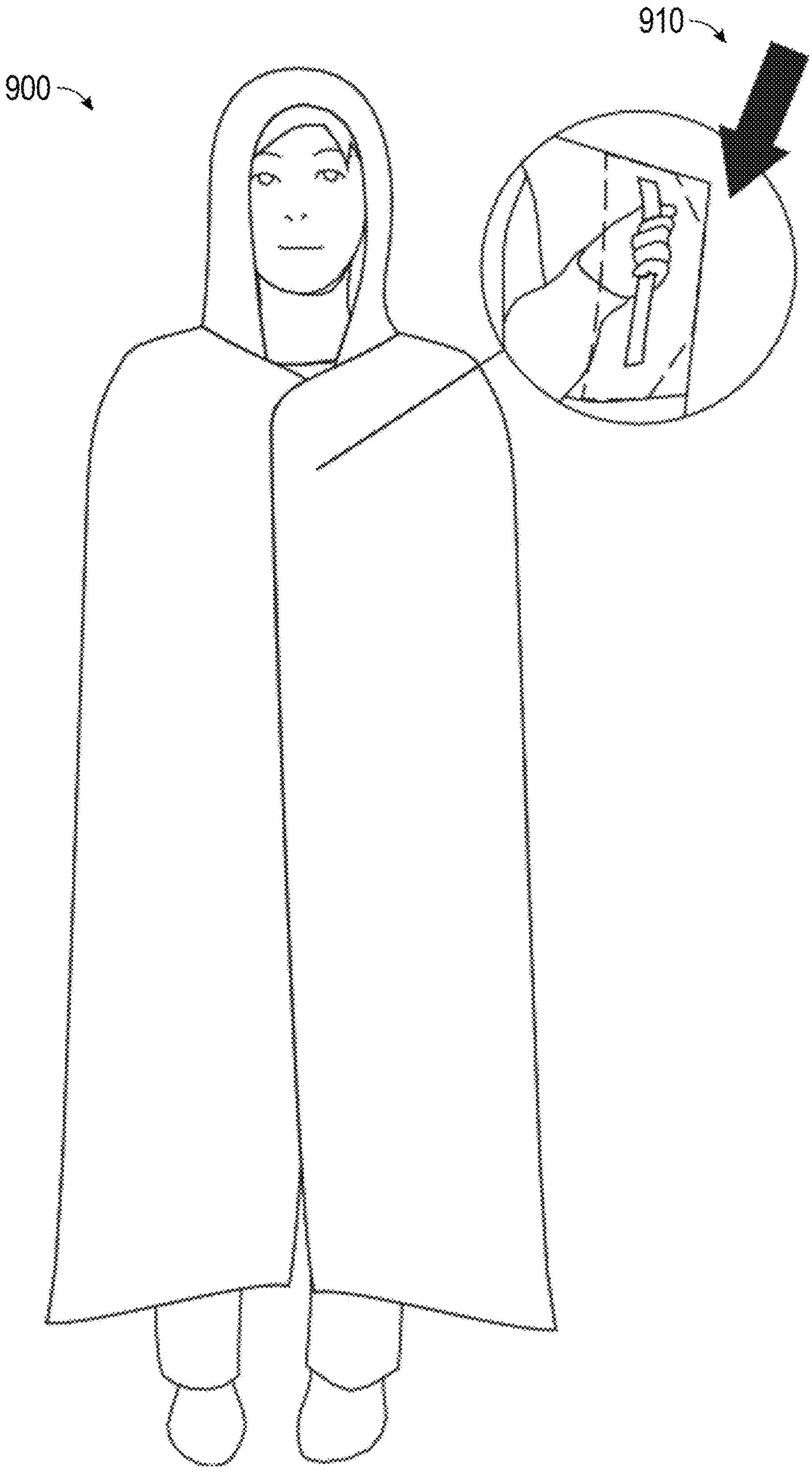
FIG. 9 shows a front view of the fire blanket with a cutout of the user handle, in accordance with an exemplary embodiment of the present invention.

FIG. 6 shows an exploded view of an alternative embodiment of the fire blanket. It includes:

Hood (800)
Hand covers (802)
Handles (804)
Pockets (806)
Drawstring in channel (808)
Interior panel (810)
Snap rivets (812)
Gusset (814)
Shape memory wire (816)
Exterior panel (818)
Drag line at base of hood (820)—not shown
Emergency seat (822)—not shown
D-ring and clip (824)—not shown The fire blanket consists of 3 layers:

1. Outward facing layer
2. Interlining layer (shape memory wire and pencil pockets)
3. Interior layer FIGS. 7-9 show views of a person wearing the deployed fire blanket.

FIG. 10 is a graph showing the martensite/austenite fractions during phase transformation of the nickel-titanium fibers.

FIG. 11 is a graph showing the strain-temperature characteristics during phase transformation of the nickel-titanium fibers.

The fire escape blanket 100 may include a thermal housing 102 comprising multiple layers. As shown in FIGS. 1-3, the thermal housing 102 may have a first outer layer 104 and a second inner layer 106, both made of fire-resistant material. The first outer layer 104 and second inner layer 106 may be connected by a gusset 116 around the perimeter of the blanket. The gusset 116 may allow the thermal housing 102 to expand when the shape memory elements 110 are activated.

Referring to FIGS. 2A and 2B, the fire escape blanket 100 may include one or more shape memory elements 110 retained within a compartment 112 of the thermal housing 102. The shape memory elements 110 may be made of a nickel-titanium alloy or other suitable shape memory material. At normal ambient temperatures, the shape memory elements 110 may have a first compact orientation. When exposed to temperatures above an activation temperature, such as around 46° C. (115° F.), the shape memory elements 110 may expand to a second enlarged orientation.

As shown in FIG. 3, the expansion of the shape memory elements 110 may create air pockets between the first outer layer 104 and second inner layer 106 of the thermal housing 102. These air pockets may provide enhanced thermal insulation and protection for a user during a fire event. The gusset 116 may allow the layers to separate and accommodate the expansion of the shape memory elements 110.

Referring to FIG. 4, the fire escape blanket 100 may include additional features to enhance its protective and functional capabilities. A hood portion 800 may be connected to the thermal housing 102 to provide protection for a user's head and neck. The hood portion 800 may include a drawstring 402 to allow adjustment and secure fit around the user's face.

The fire escape blanket 100 may also include one or more hand covers 802 connected to the thermal housing 102. As shown in FIGS. 4 and 5, the hand covers 802 may overlay handles 416. The handles 416 may allow a user to securely grasp and position the blanket. In some embodiments, multiple handles may be provided in different orientations to facilitate various carrying or dragging positions.

A dragline 418 may be incorporated into the fire escape blanket 100, with at least a portion retained within the thermal housing 102. The dragline 418 may allow rescuers to pull a user wearing the blanket to safety. A D-ring and clasp assembly 420 may also be provided to secure the blanket to a user during movement or when being pulled.

As shown in FIG. 4, one or more pockets 414 may be included on the interior surface of the fire escape blanket 100. These pockets 414 may allow storage of small personal items during evacuation. An emergency seat portion 422 may also be incorporated to allow the blanket to function as a rescue sling if needed.

The fire escape blanket 100 may utilize pencil pockets 208, as shown in FIG. 2A, or other fastening mechanisms to secure the shape memory elements 110 within the thermal housing 102. This may help maintain proper positioning and distribution of the shape memory elements 110 throughout the blanket.

In operation, the fire escape blanket 100 may begin in a compact folded state at normal temperatures. When exposed to heat from a fire, the shape memory elements 110 may automatically activate and expand, creating insulating air pockets within the thermal housing 102. A user may don the blanket by placing it over their body, inserting their head through the hood portion 800, and grasping the handles 416 through the hand covers 802. The drawstring 402 may be tightened to secure the hood, and the D-ring and clasp 420 may be fastened to keep the blanket in place.

The expanded air pockets created by the activated shape memory elements 110 may provide enhanced thermal protection as the user evacuates through heat and flames. The fire-resistant outer layers 104, 106 may offer additional protection from direct flame contact. If needed, the dragline 418 or emergency seat 422 features may be utilized by rescuers to assist in evacuation.

By providing passive, self-activating expansion and enhanced thermal protection, the fire escape blanket 100 may offer improved safety and survivability compared to conventional fire blankets. The incorporation of shape memory elements 110 to create tunable air pockets represents a novel approach to personal fire protection equipment.

FIGS. 7-9 illustrate exemplary embodiments of a user wearing the fire blanket. In FIG. 7, a user 700 is shown wearing the fire blanket with the hood portion 102 covering their head. The user is grasping the drawstrings 402 of the hood with both hands to adjust and secure the hood in place. This allows the user to customize the fit of the hood for optimal protection and visibility.

FIG. 8 depicts a user 800 wearing the fire blanket with the front open, revealing how the blanket can be quickly donned in an emergency situation. The user is holding the edges near the collar, demonstrating the ease of adjusting the blanket's coverage. An enlarged circular inset 810 shows a close-up view of the D-ring and clasp assembly. This fastening mechanism allows the user to securely attach the blanket around their body, preventing it from slipping off during movement or evacuation.

In FIG. 9, a user 900 is shown fully enveloped in the fire blanket, with only their face visible. This illustrates the comprehensive coverage provided by the blanket for maximum protection against heat and flames. An enlarged circular inset 910 highlights a close-up view of the user's hand grasping one of the handles. These strategically placed handles serve multiple purposes:

1. They allow the user to securely hold the blanket closed around their body.
2. They provide a means for rescuers to grasp and guide the user if visibility is limited.
3. They can be used to carry the blanket when not in use or to assist in deploying it quickly.

The inclusion of these handles enhances the blanket's versatility and effectiveness in various emergency scenarios.

These figures demonstrate key benefits of the fire blanket design:

1. Adaptability: The adjustable hood and multiple handling options allow users of different sizes to effectively utilize the blanket.
2. Ease of use: The simple design enables quick deployment and donning in high-stress situations.
3. Comprehensive protection: When fully deployed, the blanket covers nearly the entire body, providing a protective barrier against heat and flames.
4. Enhanced safety features: The D-ring and clasp assembly ensures the blanket remains securely in place during use, while the handles facilitate movement and rescue operations.
5. Versatility: The blanket can be worn in different configurations depending on the specific emergency situation and user needs.

By incorporating these features, the fire blanket provides a user-friendly and effective solution for personal protection during fire emergencies, potentially increasing survival rates and reducing injuries in hazardous situations.

Technical Advantages:

The fire escape blanket provides several key technical advantages over conventional fire blankets:

1. Passive activation: The shape memory elements automatically expand when exposed to high temperatures, creating insulating air pockets without any user effort required. This provides enhanced protection even if the user is incapacitated.
2. Tunable protection: As temperatures increase, the shape memory elements continue expanding to create larger air pockets, providing greater insulation against more intense heat. This allows the blanket to self-adjust its protective capabilities based on the fire conditions.
3. Improved thermal resistance: Testing indicates the fire escape blanket with expanded shape memory elements may provide up to 30 times greater thermal resistance compared to a conventional fire blanket. This significant increase in insulation can dramatically improve survival chances.
4. Structural integrity: The expanded shape memory elements provide rigidity and structure to the blanket, helping maintain air pockets and separation from heat sources even under challenging conditions.
5. Multifunctional design: Features like the hood, handles, dragline, and emergency seat allow the blanket to serve multiple protective and rescue functions beyond basic thermal insulation.

Alternative Embodiments

1. Shape memory element configurations: While the primary embodiment uses nitinol wire, alternative configurations could include:
   Nitinol springs for greater expansion
   Nitinol mesh for more uniform coverage
   3D printed shape memory structures for optimized geometries
2. Fabric variations: Different fire-resistant fabrics could be used for the exterior and interior layers to optimize protection, breathability, and cost. Options may include:
   Nomex for lightweight protection up to 260° C.
   Aramid fabrics for protection above 800° C.
   Aluminized fabrics for enhanced radiant heat reflection
3. Integrated electronics: Future versions could incorporate:
   GPS locators to aid rescue efforts
   Temperature sensors to provide user feedback
   LED lighting for improved visibility
4. Flotation capability: Buoyant materials could be integrated to allow the blanket to serve as an emergency flotation device.
5. Modular design: The blanket could be designed with detachable components to allow customization for different applications or to replace damaged sections.

Methods:

1. Method of thermal protection:
   a) At ambient temperatures, shape memory elements remain in compact first orientation
   b) When exposed to activation temperature (approximately 46° C.), shape memory elements begin phase transformation
   c) As temperature increases, elements expand to second orientation, creating insulating air pockets
   d) Air pockets grow larger with further temperature increase, providing enhanced insulation
   e) Expanded structure maintains separation between user and heat source
2. Method of use:
   a) User retrieves fire escape blanket from storage
   b) If not automatically deployed, user steps on deployment foothold to manually expand blanket c) User dons blanket, covering body and using hood to protect head
d) Drawstring may be used to tighten hood around face
e) User grasps handles to secure blanket around body
f) If needed, user can sit on emergency seat portion
g) D-ring and clasp may be used to secure blanket for movement
h) Dragline allows rescuers to pull user if incapacitated 3. Method of manufacturing:
   a) Shape memory wire is pretrained to activate at specified temperatures
   b) Wire is integrated into fire-resistant fabric layer using pencil pockets or other fastening method
   c) Multiple fabric layers are assembled with gussets to allow expansion
   d) Functional components like hood, handles, and pockets are attached
   e) Quality control testing is performed to verify activation temperatures and expansion
4. Method of maintenance:
   a) Periodic inspection of fabric layers for damage or wear
   b) Testing of shape memory elements to ensure proper activation
   c) Replacement of individual components as needed
   d) Refolding and proper storage to maintain compact form when not in use

ADDITIONAL DESCRIPTION

As described above, the present disclosure relates, in various aspects, to the novel use of shape memory wire and fire-resistant fabric to create an innovative fire blanket. The proposed solution is to develop shape memory elements to meet the fire blanket's cost, composition, shape, weight, and activation temperatures. A shape memory element such as, shape memory wire will be encased between layers of inherently flame-resistant textile to create a fire blanket. In this configuration, and when the fire blanket is first exposed to excessive heat or fire, the shape memory wire is activated and expands creating air pockets. These air pockets are passively activated and create space between the excessive heat or flames and the user's clothing and skin. In a low heat environment, below the shape memory wire activation temperature, the shape memory wire is in a default inactive state. In this state, the fire blanket exists without air pockets. As the surrounding temperature increases and exceeds the activation temperature due to excessive heat or fire, the shape memory element expands to create air pockets. With further exposure to the excessive heat and/or flames above the activation temperature the shape memory wire continues to expand creating larger air pockets. The capabilities of the shape memory wire can be achieved passively with no effort on the part of the user. This phase transformation continues until the limits of the trained metal are reached. Currently, there is no fire blanket available for purchase which includes passively activated and expandable air pockets to improve protection from excessive heat and fire.

The fire blanket hood provides protection to the head and neck while also helping to secure the fire blanket to the user. The hand covers protect the user's hands while holding the handles. The handles may be used by the user to secure the fire blanket when used around the body and a second set of handles can also be used by two users to carry a third person who is seated on the fire blanket in an emergency. The handles could include the ability to tighten the hood and shoulder area.

The interior pockets allow the user to quickly grab and store keys, important papers, and other small items as they evacuate excessive heat or fire.

When not deployed automatically, a deployment step may be added to aid people in the deployment of the fire blanket. The interlining pencil pockets, connectors or other connecting mechanism will improve production time and attach the shape memory interlining to the exterior layers. Fluorescent labeling will be used to make the fire blanket more visible in low light and smokey conditions. Regulatory labels will be used to meet regulatory requirements. Branding labels will be used for branding and loyalty program development.

The gusset is connected by fastener including, but not limited to, a heat resistant button snap connector, a button, and/or a snap rivet or may be sewn into the fire-resistant fabric layers. The interlining and/or shape memory element may be connected by pencil pockets, or a fastener including, but not limited to, a heat-resistant button snap connector, to the fire-resistant fabric layers. The shape memory wire interlining, when in its martensite state whether in storage or fully formed, is flexible and resides at a temperature lower than the activation temperature. When deployed the fire blanket will protect the user from flames and excess heat directed toward the exterior layer, but this embodiment will not address survival risks due to toxic air and air temperatures that may be harmful to human health. The fire blanket provides the needed protection to evacuate a fire event, in a timely manner, while exposed to excess heat and flames.

In an aspect, the novel fire protection blanket is distinguished from the currently available fire blankets by their expandable air layers that are tunable and completely passively, according to the fire conditions and the heat transmission through the blanket. The presence and size of air pockets between the layers of fire-resistant fabric affect the energy transfer between the excess fire, heat source and the user. Air pocket research in 2012, conducted by Yehu Lu, Jun Li, Xiaohui Li and Guowen Song found that air pockets of 9-12 mm (0.4"-0.5") provided maximum thermal protection. Testing has focused on an air pocket of approximately 50.8 mm (2") to approximately 101.6 mm (4") to provide increased air space, shape memory wire space, and physical separation from debris and obstacles. Research conducted in 1999 by David Torvi found that although there is concern for convective heat during a fire event, thermal radiation between the user and external fabric layer is the most important.

Heat flux across air pockets is a function of the pocket width. The air pocket provides resistance to conductive and radiative heat with the conductive heat transfer affected primarily by pocket thickness and the radiative resistance dependent upon surface temperatures. The ability of air pockets to maintain the pocket during use is an important characteristic and is aided by the shape memory wires expansion.

The blanket coating emissivity is estimated to be equal to 0.1. With this assumption, the radiant heat flux absorbed by the blanket is estimated to be at 4.2 kW/m2 and the temperature at the blanket outside surface is of about 930° C. (1,886° F.) for a flame temperature of 1,030° C. (1,706° F.). The conductive thermal resistance provided by the blanket without the shape memory alloy is of 0.0074 m2K/W while the combined conductive/convective thermal resistance of the blanket with the shape memory alloy layer of cells is estimated to be of 0.21 m2K/W. This means that while the blanket alone may drop the temperature by 30° C. (86° F.), the blanket with the shape memory alloy will drop the temperature inside the blanket by about 900° C. (1, 600°

F.) giving sufficient protection for the user. These calculations are based on a convective heat transfer coefficient of 5 W/m2K within the shape memory alloy layer of cells. These preliminary first order estimates show an increase in thermal resistance of about 30 times the resistance of the original blanket. This outcome clearly highlights the importance and the effectiveness of the introduction of the shape memory alloy insulating structure within the protective blanket.

In an aspect, the shape memory wire is placed or produced in a woven chain link and/or mesh design optimized for a short transformation response time, increased force, and to minimize weight and/or bulk.

In some aspects, the exterior lining is configured for protection from excessive heat and fire. This layer is durable and flexible. The exterior and interior linings encase the interlining and provide protection from excessive heat and flame. The shape memory alloy interlining has been pretrained to activate and passively deploy the fire blanket when the predetermined activation temperature is reached. The interlining is made of a shape memory wire alloy that has been trained to transform at predetermined temperatures.

In some aspects, the interlining is configured for protection from excessive heat and fire. This layer is flexible and is breathable allowing moisture to escape. The interlining is connected by pencil pockets, or a fastener including, but not limited to, a heat-resistant button snap connector, or other connecting mechanism to one or more fire-resistant fabric layers. The shape memory alloy interlining, when in its martensite state whether in storage or fully formed, is flexible and resides at a temperature lower than the activation temperature. Once the activation temperature is reached, the austenite phase transformation, which is stiffer than the martensite phase, begins with the alloy becoming firm. When deployed the fire blanket will protect the user from flames and excess heat directed toward the exterior layer, but this embodiment will not address survival risks due to toxic air and air temperatures that may be harmful to human health. The fire blanket provides the needed protection to evacuate a fire event, in a timely manner, while exposed to excess heat and flames.

In some aspects, the interlining has shape memory transformation, a stable frame, and a secure wire structure. The interlining assists in providing a method for fire blankets to deploy and provides some stability to the fire blanket A deployment step may be added to aid in deployment in cases where localized temperatures have not become excessive. Producing the interlining as a separate functioning piece improves production time and allows the insertion of the interlining between the two exterior layers in one step. Fluorescent labeling will be used to make the fire blanket more visible in low light and smokey conditions. Regulatory labels will be used to meet regulatory requirements. Branding labels, third-party branding and loyalty program development may be implemented.

Thermal Mechanical Analysis (TMA) testing was performed to compare nitinol round wire of various widths for transformation response time, force at transformation and transformation distance covered. It was found that an unbundled 1 mm wire provided the overall quickest response with the most force. Additional testing compared nitinol springs, mesh and round wire configurations. While the spring provides a better overall response, its potential bulk and limited coverage area per spring limited its performance. The mesh wire improved manufacturing processes and allowed for a more uniform response throughout the invention, but its current cost and difficulty in finding manufacturing resources helped the focus on nitinol round wire.

It is understood that the above diagrams, embodiments, and descriptions are only illustrative of the present invention and that changes in structure, materials and modes of utilization are possible due to additional testing, technological improvements in fire resistant textiles and shape memory wire alloy compositions without departing from the scope of the present invention.

The human body is constructed to operate optimally at approximately 37° C. (98° F.). At a temperature of 40° C. (104° F.), an area where most serious heat related injury can occur, the body can become hyperthermic. Above 43° C. (110° F.) organs and bodily functions may begin to shut down. Above 46° C. (115° F.) death may occur. The shape memory wire has been pretrained to activate at approximately (46° C.) (115° F.) with full deployment, based on increasing temperatures. Because increasingly many communities have frequent one-time daily indoor temperatures of (43° C.) (110° F.), an activation temperature of 46° C. (115° F.) has been identified. Without any effort on the part of the user, the fire blanket will begin to deploy itself at the activation temperature. At any time, the user may step on the deployment foothold to extend the fire blanket manually.

In an aspect, the interlining may consist of a single joined nitinol wire configuration. Future versions of the shape memory alloy will focus on a more solid mesh design with improved wire technology to provide a faster response with more force. This design would include the placement of the shape memory wire inside of a layer of fire-resistant fabric.

In an aspect, the integration of the shape memory alloy into the textiles may eliminate the interlining.

In an aspect, the fire blanket may have added features to make the invention work better including, but not limited to, a flotation system, a location device including, but not limited to, GPS, a lighter weight external fabric, an improved metal technology including 3D printing.

In an aspect, the fire blanket may be used for alternative means including, but not limited to, carrying or dragging someone in an emergency, extinguishing a kitchen and/or a grill fire, flotation devices that aid in surving fires aboard water craft and/or protecting equipment and/or property.

In an aspect, the fire blanket will offer two versions of exterior fabric. One will offer excessive heat and fire protection up to 260° C. (500° F.). The second will offer protection in excess of 816° C. (1500° F.). The shape memory wire must have an activation temperature above the new normal high room temperature, but lower than a temperature where a person is not able to function.

In an aspect, the exterior and interior textiles are using a combination of one or more Nomex, Aramid, Aluminized and silica fire resistant fabrics. These textiles have the best heat tolerances and these textiles avoid asbestos. The shape memory wire alloy NiTi may be used. NiTi is a commonly used alloy. There are specialty NiTi alloy combinations that may perform better, but they are more expensive and harder to procure. During experimentation with nitinol titanium iron (NiTiFe) alloy, results indicate the NiTi to perform as well or better for the fire blanket purposes providing a quicker performance in a short period of time.

In an aspect, the process for thermal analysis will neglect the convective contribution to the heat transfer on the outside of the blanket exposed to fire in comparison with the radiative fluxes. The blanket coating emissivity is estimated to be equal to 0.1. With this assumption, the radiant heat flux absorbed by the blanket is estimated to be 9.8 kW/m2 and with the temperature on the blanket outside surface at approximately 750° C. (1,382° F.) for a flame temperature of 1,000° C. (1,832° F.).

In another aspect, the conductive thermal resistance provided by the blanket without the shape memory element is 0.0074 m2K/W while the combined conductive/convective thermal resistance of the blanket with the shape memory element layer of cells is estimated to be 0.075 m2. K/W. This means that while the blanket alone may drop the temperature by 30° C. (86° F.), the blanket with the shape memory elements will drop the temperature inside the blanket by about 730° C. (1,346° F.) providing sufficient protection for the user. These calculations are based on a convective and radiant heat transfer coefficient of 15 W/m2K within the shape memory element layer of cells.

These preliminary first order estimates show an increase in thermal resistance of about 10 times the resistance of the original blanket. This outcome clearly highlights the importance and the effectiveness of the introduction of the shape memory element insulating structure within the fire blanket.

The tests will be conducted to ensure that the safe limits of operation of the different layers are not exceeded in order not to degrade the structural integrity of the fire blanket. For example, aluminum foil layers begin to melt at 660° C. (1220° F.). Between 732° C. (1350° F.) and 877° C. (1610° F.), fiberglass layers becomes brittle. Further, at 1,093° C. (2000° F.), the silica reflective layers becomes brittle. Further testing of the thermal protective performance of the fire blanket prototypes will develop solid theoretical predictions and experimental demonstrations of the fire blanket with at least an order of magnitude improvement of the thermal resistance of the blanket to heat propagation as compared to currently available fire blankets.

In an aspect, the potential outcomes of the project are the creation of a fire blanket to help people survive fire events or exposures to excessive heat. Project outcomes will also address peace of mind and survival value propositions by communicating the need to prepare for fire events. The project will continue to research shape memory elements by developing a sound theoretical and experimental program to measure the effect of the various design constraints and performance under different fire and thermal radiation and convection scenarios. The further outcomes include continued research with shape memory elements to create additional fire protection and community risk reduction tools.

In another aspect, the invention also offers the longer-term benefit of prompting people to prepare for fire events. The key differentiator is the use of the shape memory element technology in fire blankets and when complimented with the heat resistant fabric creates a tool to reduce fire event injury. The shape memory element technology does not appear to be used by any fire blanket competitor. The invention will address the underserved value propositions of peace of mind and survivability while educating and helping homeowners to prepare for fire events. Shape memory elements are smart metal alloys that have the ability to be trained to transition from an original shape to an altered temporary state when exposed to changes in temperature. The innovative use of the shape memory elements to create air pockets in fire blankets is disruptive and novel in that the air pockets create an increased level of protection that no competitive products have been found to contain.

In some aspects, the techniques described herein relate to a fire blanket having an expandable textile with heat activated elements, including: a thermal housing; and one or more shape memory elements having a first orientation at a first temperature, the one or more shape memory elements are retained within a compartment of the thermal housing, the one or more shape memory elements are configured to expand to a second orientation when exposed to a second temperature being greater in value than the first temperature.

In some aspects, the techniques described herein relate to a fire blanket, wherein the thermal housing having a first layer being a fire-resistant material, the first layer overlaying a second layer being a fire-resistant material.

In some aspects, the techniques described herein relate to a fire blanket, further including a gusset connecting the first layer of the thermal housing to the second layer of the thermal housing.

In some aspects, the techniques described herein relate to a fire blanket, further including a hood portion, the hood portion is connected to at least a portion of the thermal housing.

In some aspects, the techniques described herein relate to a fire blanket, further including a one or more hand covers connected to at least a portion of the thermal housing, the one or more hand covers overlaying one or more handles.

In some aspects, the techniques described herein relate to a fire blanket, wherein handles are orientated parallel to each other on each side of the blanket where at least a portion of the one or more hand covers overlays the first handle and the second handle.

In some aspects, the techniques described herein relate to a fire blanket, further including a dragline, at least a portion of the drawline is retained within a track of the thermal housing.

In some aspects, the techniques described herein relate to a fire blanket, further including a pocket.

In some aspects, the techniques described herein relate to a fire blanket, further including a channel formed between the thermal housing and the one or more shape memory elements.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications can be referenced. The disclosures of these publications in their entirety are hereby incorporated by reference into this application in order to more fully describe the state of the art to which this pertains. The references disclosed are also individually and specifically incorporated by reference herein for the material contained in them that is discussed in the sentence in which the reference is relied upon Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

Although very narrow claims are presented herein, it should be recognized the scope of this disclosure is much broader than presented by the claims. It is intended that broader claims will be submitted in an application that claims the benefit of priority from this application.

What is claimed:

1. A fire blanket having an expandable textile with heat activated elements, comprising:

a thermal housing comprising a first layer of fire-resistant material and a second layer of fire-resistant material;

a gusset comprising one or more folds connecting the first layer of the thermal housing to the second layer of the thermal housing, wherein the gusset is configured to unfold and allow expansion of the thermal housing;

one or more shape memory elements comprising a shape memory wire further comprising nickel-titanium alloy, or other shape memory metals in combination with iron or other metals forming a wire, having a first orientation at a first temperature, the one or more shape memory elements are retained within a compartment of the thermal housing between the first layer and the second layer, the one or more shape memory elements are configured to a second orientation when exposed to a second temperature being greater in value than the first temperature, wherein the expansion of the one or more shape memory elements causes the gusset to unfold and form air pockets between the first layer and the second layer, the air pockets providing enhanced thermal resistance and protection from excessive heat and flame; and further comprising a hood portion, the hood portion is connected to at least a portion of the thermal housing.

2. The fire blanket of claim 1, wherein the one or more folds of the gusset are accordion type folds.

3. The fire blanket of claim 1, further comprising a hood portion, the hood portion is connected to at least a portion of the thermal housing, wherein the one or more shape memory elements extend into the hood portion.

4. The fire blanket of claim 1, further comprising one or more hand covers connected to at least a portion of the thermal housing, the one or more hand covers overlaying one or more handles, wherein the one or more hand covers comprise fire-resistant material.

5. The fire blanket of claim 4, wherein two handles are oriented parallel to each other and at least a portion of the one or more hand covers overlays the first handle and the second handle.

6. The fire blanket of claim 1, further comprising a dragline, at least a portion of the dragline is retained within the thermal housing, wherein the dragline comprises heat-resistant rope configured to enable pulling of a user wearing the fire blanket.

7. The fire blanket of claim 1, further comprising a pocket attached to the second layer and configured to store personal items.

8. The fire blanket of claim 1, wherein a channel is formed between the thermal housing and the one or more shape memory elements, the channel comprising the air pockets formed when the one or more shape memory elements expand to the second orientation.

9. The fire blanket of claim 1 further comprising a D-ring and clasp used to secure the blanket to the user when moving or if immobile when pulled by a dragline.

10. A fire escape blanket comprising:

a thermal housing having an interior layer comprising fire-resistant material and an exterior layer comprising fire-resistant material;

a shape memory element disposed between the interior layer and exterior layer, the shape memory element having a first compact configuration at a first temperature and a second expanded configuration at a second higher temperature, wherein the shape memory element is configured to begin transitioning to the second configuration at a predetermined temperature threshold;

a gusset comprising one or more folds connecting the interior layer to the exterior layer and allowing expansion of the thermal housing when the shape memory element transitions to the second expanded configuration, wherein the one or more folds unfold to form air pockets between the interior layer and the exterior layer, the air pockets providing enhanced thermal resistance;

a hood portion connected to the thermal housing wherein the shape memory element extends into the hood portion;

at least one handle attached to the thermal housing; and a drawstring for tightening the hood portion, the drawstring retained within a channel in the hood portion.

11. The fire escape blanket of claim 10, further comprising at least one hand cover overlaying the at least one handle, wherein the at least one hand cover comprises fire-resistant material.

12. The fire escape blanket of claim 11, further comprising a pocket attached to the interior layer, the pocket configured to store personal items.

13. The fire escape blanket of claim 10, wherein the one or more folds of the gusset are accordion type folds.

14. The fire escape blanket of claim 12, further comprising a dragline attached to the thermal housing, wherein the dragline comprises heat-resistant rope configured to enable pulling of a user wearing the fire escape blanket.

15. The fire escape blanket of claim 10, further comprising a D-ring and clasp for securing the blanket to a user.

16. The fire escape blanket of claim 14, further comprising an emergency seat portion, comprising a reinforced base section of the thermal housing configured to support a user in a seated position during rescue operations.

* * * * *